(12) United States Patent
Rehfuss et al.

(10) Patent No.: US 11,738,674 B2
(45) Date of Patent: Aug. 29, 2023

(54) HEADREST MODULE FOR A MOTOR VEHICLE SEAT

(71) Applicant: Dr. Ing. h.c. F. Porsche Aktiengesellschaft, Stuttgart (DE)

(72) Inventors: Benjamin Rehfuss, Rutesheim (DE); Max Nitsch, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/187,893

(22) Filed: Mar. 1, 2021

(65) Prior Publication Data
US 2021/0276468 A1 Sep. 9, 2021

(30) Foreign Application Priority Data
Mar. 9, 2020 (DE) .................. 10 2020 106 295.8

(51) Int. Cl.
*B60N 2/865* (2018.01)
*B60N 2/85* (2018.01)
*B60N 2/844* (2018.01)
*B60N 2/847* (2018.01)
*B60N 2/80* (2018.01)

(52) U.S. Cl.
CPC ............. *B60N 2/865* (2018.02); *B60N 2/844* (2018.02); *B60N 2/847* (2018.02); *B60N 2/85* (2018.02); *B60N 2002/899* (2018.02)

(58) Field of Classification Search
CPC ......... B60N 2/865; B60N 2/844; B60N 2/847
See application file for complete search history.

(56) References Cited

U.S. PATENT DOCUMENTS 2,973,029 A * 2/1961 Schlosstein ............ B60N 2/865
297/216.12
4,278,291 A * 7/1981 Asai ....................... B60N 2/888
297/216.12

(Continued)

FOREIGN PATENT DOCUMENTS

DE 102007041498 B3 2/2009
DE 102010003109 A1 11/2010

(Continued)

*Primary Examiner* — David R Dunn
*Assistant Examiner* — Tania Abraham
(74) *Attorney, Agent, or Firm* — Leydig, Voit & Mayer, Ltd

(57) ABSTRACT

A headrest module for a motor vehicle seat includes a base component and a headrest mounted in the base component. The headrest is configured to be guided in a vehicle longitudinal direction so as to be extendable and retractable relative to the base component. The headrest further includes a fixing mechanism having a first fixing element with teeth and a second fixing element configured to be moved towards the first fixing element for engagement between adjacent teeth. Contact faces of the two fixing elements are configured such that an extension of the headrest is possible under the action of a force on the headrest in an extension direction. A movement of the headrest in a retraction direction is possible under action of a release mechanism of the headrest module configured to move the second fixing element out of the region between the teeth of the first fixing element.

12 Claims, 5 Drawing Sheets

(56) References Cited

U.S. PATENT DOCUMENTS

| | | | | |
|---|---|---|---|---|
| 4,856,848 A * | 8/1989 | O'Sullivan | ............ | B60N 2/865 |
| | | | | 297/391 |
| 8,303,038 B2 * | 11/2012 | Smith | .................... | B60N 2/865 |
| | | | | 297/410 |
| 8,534,760 B2 * | 9/2013 | Kotz | ...................... | B60N 2/818 |
| | | | | 297/391 |
| 9,085,253 B2 * | 7/2015 | Delling | .................. | B60N 2/891 |
| 10,046,680 B2 * | 8/2018 | Cao | ........................... | B60N 2/80 |
| 2010/0072791 A1 * | 3/2010 | Brunner | ................. | B60N 2/856 |
| | | | | 297/354.1 |
| 2010/0270841 A1 | 10/2010 | Sobieski et al. | | |
| 2010/0301654 A1 | 12/2010 | Sobieski et al. | | |
| 2011/0241393 A1 * | 10/2011 | Schmitz | ................. | B60N 2/888 |
| | | | | 297/216.12 |
| 2011/0272977 A1 | 11/2011 | Froese et al. | | |
| 2015/0352989 A1 * | 12/2015 | Ishihara | .................. | B60N 2/818 |
| | | | | 297/406 |
| 2018/0257531 A1 * | 9/2018 | Jarrin | ...................... | B60N 2/865 |
| 2019/0039491 A1 * | 2/2019 | Gomez | .................. | B60N 2/844 |
| 2020/0180483 A1 * | 6/2020 | Kober | ...................... | B60N 2/77 |
| 2020/0247294 A1 * | 8/2020 | Kang | ...................... | B60N 2/868 |
| 2021/0245639 A1 * | 8/2021 | Morilhat | ................. | B60N 2/821 |

FOREIGN PATENT DOCUMENTS

| | | |
|---|---|---|
| DE | 102010002525 A1 | 12/2010 |
| DE | 102010034982 B3 | 2/2012 |
| WO | WO 2012015203 A2 | 2/2012 |
| WO | WO 2014154536 A1 | 10/2014 |
| WO | WO 2019238516 A1 | 12/2019 |

* cited by examiner

HEADREST MODULE FOR A MOTOR VEHICLE SEAT

CROSS-REFERENCE TO PRIOR APPLICATIONS

Priority is claimed to German Patent Application No. DE 10 2020 106 295.8, filed on Mar. 9, 2020, the entire disclosure of which is hereby incorporated by reference herein.

FIELD

The present disclosure is directed to a headrest module for a motor vehicle seat, with a base component and a headrest mounted therein, wherein the headrest can be guided in a vehicle longitudinal direction of the headrest module so as to be extendable and retractable relative to the base component, and with a fixing mechanism between the base component and the headrest.

BACKGROUND

Headrest modules in motor vehicles serve primarily for the safety of vehicle occupants. In a collision, they prevent the occupant's head from being flung back unhindered against the direction of travel, whereby the vehicle occupant could suffer considerable physical injuries. To receive the head of the vehicle occupant early during the reverse motion of the head, in the prior art, as well as conventional fixed headrest modules, modules are also known in which part of the headrest module, referred to below as the headrest, is movable in a vehicle longitudinal direction of the headrest module.

The known movable headrest modules comprise a base component and a headrest, the latter in its function as a head support part, wherein the base component is fixedly connected to a vehicle seat backrest and, in the event of an accident, the headrest is moved forward by various mechanisms in the direction of the vehicle occupant's head.

A headrest module of the type cited initially which has the features of the preamble of claim 1 is known from DE 10 2010 034 982 B3. Here, a separate locking device is arranged between the base component and the headrest, which locks the headrest at a desired distance from the base component. This locking device consists of a movement strip with a slot, which is attached to the base component, and a pin attached to the headrest. In the event of an accident, the vehicle occupant's head is pressed against the headrest on its movement against the direction of travel. This releases the lock of the pin inside the groove of the movement strip, whereby the headrest can be shifted in the direction of the base component. Because of the rearward movement of the headrest, the vehicle occupant's head is not stopped immediately but slowed down over the length of extended rail or strip guides until the headrest hits the base component. Only then is braking achieved by the rigid base component, which is connected to the vehicle seat backrest via fixing rods.

A headrest module which also has the features of the preamble of claim 1 is disclosed in DE 10 2007 041 498 B3. Here, it is provided that in an accident, the headrest moves away from the base component, i.e. forward in the vehicle longitudinal direction. To achieve this, between the headrest and the base component, a further component is arranged which is configured in two parts, wherein contact faces of these two parts are arranged at an angle to a plane running perpendicularly to the vehicle longitudinal direction. When these two parts are twisted during an accident, they act on the base component and the headrest so that the headrest is moved away from the base component. This further component is triggered for example after release of a locking device, for example via a Bowden cable drive which is activated on presentation of an inertial force provoked by the vehicle occupant, for example on the seat backrest, or the lock is released under the action of a preload of a spring by a pyrotechnic device, such as by breaking of a retaining lug or retaining pin.

SUMMARY

In an embodiment, the present invention provides a headrest module for a motor vehicle seat. The headrest module includes a base component and a headrest mounted in the base component. The headrest is configured to be guided in a vehicle longitudinal direction of the headrest module so as to be extendable and retractable relative to the base component. The headrest further includes a fixing mechanism between the base component and the headrest. The fixing mechanism has a first fixing element with teeth, the first fixing element being arranged in a vehicle longitudinal direction, and a second fixing element configured to be moved towards the first fixing element for engagement between adjacent teeth. Contact faces of the two fixing elements are configured such that an extension of the headrest is possible under the action of a force on the headrest in an extension direction. A movement of the headrest in a retraction direction is possible under action of a release mechanism of the headrest module configured to move the second fixing element out of the region between the teeth of the first fixing element.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
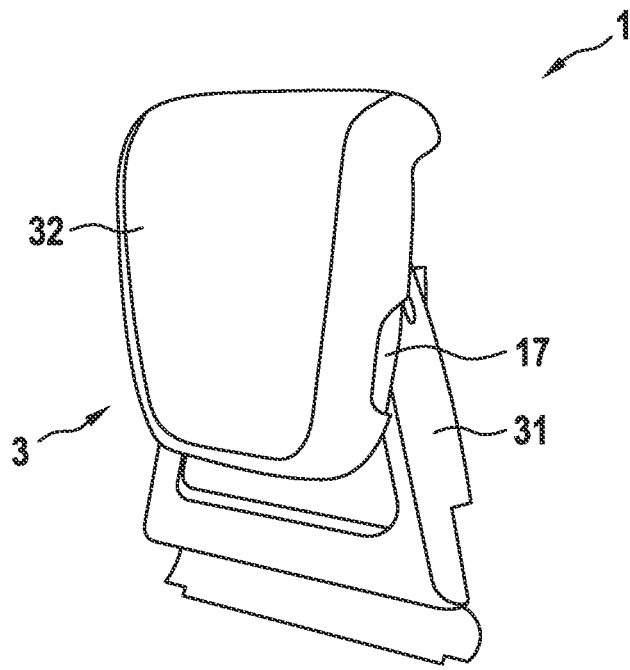
FIG. 1 provides a view of a backrest structure of a motor vehicle seat with headrest module attached thereto, looking obliquely towards the rear with respect to the direction of travel of the motor vehicle.

The present disclosure provides a headrest module for a motor vehicle seat, with a base component and a headrest mounted therein, wherein the headrest can be guided in a vehicle longitudinal direction of the headrest module so as to be extendable and retractable relative to the base component, and with a fixing mechanism between the base component and the headrest. According to the present disclosure, the headrest module is refined so as to improve protection of a vehicle occupant's head in case of a crash, with a simple structural design of the headrest module.

The headrest module has a base component and a headrest mounted therein. The headrest is guided in a vehicle longitudinal direction of the headrest module so as to be extendable and retractable relative to the base component. The headrest module comprises the fixing mechanism between the base component and the headrest.

The fixing mechanism has a first fixing element with teeth, which is arranged in a vehicle longitudinal direction, and a second fixing element which is movable towards the first fixing element for engagement between adjacent teeth. Here, contact faces of the two fixing element are configured such that an extension of the headrest is possible under the action of a force on the headrest in its extension direction, and a movement of the headrest in the retraction direction is possible under the action of a release mechanism of the headrest module which moves the second fixing element out of the region between the teeth of the first fixing element.

Thus in principle the headrest may be gripped manually by the vehicle occupant and then extended. However, the headrest can only be retracted after actuation, in particular manual actuation, of the release mechanism, i.e. if the second fixing element is moved out of the region between the teeth of the first fixing element. In a crash, because of mass inertia and the resulting force on the headrest, the headrest extends and the distance between the vehicle occupant's head and the headrest is minimized. In the case of a crash, after the extension of the headrest caused by the mass inertia of the headrest, i.e. the movement of the headrest away from the base component, the release mechanism which has not been released prevents a retraction of the headrest under the effect of the vehicle occupant's head which moves back again during a crash event, thus providing optimal protection for the vehicle occupant's head.

The headrest module is structurally simply designed because no external means are necessary for extending the headrest in the case of a crash, but extension of the headrest takes place purely under the action of a force, in particular because of mass inertia, on the headrest.

For structural reasons, it is considered particularly advantageous if the first fixing element is mounted in the headrest and the second fixing element is mounted in the base component. Thus, in particular with the formation of an above-mentioned guide which engages in a counter-guide of the base component, the headrest is particularly suitable for receiving first fixing element which may then extend sufficiently far in the vehicle longitudinal direction, corresponding to the desired extension length of the headrest.

Preferably, the release mechanism is mounted both in the base component and also in the headrest. This allows the release mechanism to be released in any extended position of the headrest.

Preferably, the teeth of the first fixing element are formed identically and the tooth spacings between adjacent teeth are identical. In this way, identical latching spaces are ensured on extension and retraction of the headrest. The guiding of the headrest relative to the base component is particularly simple if the headrest has a guide portion with side guides, wherein the guides cooperate with guides of the base component.

With regard to this aspect, it is particularly advantageous if the side guides of the guide portion are connected by means of a connecting portion, wherein the connecting portion receives the teeth, wherein the teeth are arranged in the vehicle transverse direction and the teeth are arranged parallel to each other. The teeth are thus designed as a type of toothed strip which extends with a greater or lesser width in the region of the connecting portion.

It is considered particularly advantageous if the extent of the respective tooth in width amounts to a multiple of the extent of said tooth in height. A multiple means in particular five to fifteen times. Relatively wide teeth allow a large contact region with the second fixing element and hence high fixing forces between the headrest module and the base component in the retraction direction of the headrest.

According to a structurally particularly advantageous design, it is provided that the respective tooth has a tooth cross-section such that one tooth flank of said tooth is arranged in a plane perpendicular to the movement direction of the headrest, and another tooth flank of said tooth is arranged sloping relative to said plane, wherein the distance from said one tooth flank to the other tooth flank in the region of a base of the tooth is greater than the distance from said one tooth flank to the other tooth flank in the region remote from the base of the tooth. The one tooth flank thus serves to fix the headrest in its retraction direction, while the other tooth flank, because of the sloping arrangement, can be overridden on extension of the headrest; via said other tooth flank, the movable second fixing element is brought out of engagement with said tooth and then correspondingly out of engagement with the teeth adjacent thereto in the extension direction.

Preferably, the second fixing element comprises a plate which is mounted movably in the base component for engagement between two adjacent teeth. The plate can be moved out of the engagement position between the two adjacent teeth against the force of a spring. This movement takes place either automatically in the case of a crash because of the mass inertia of the headrest, or by manual extension of the headrest, or however by means of the release mechanism for subsequent retraction of the headrest.

Preferably, the release mechanism comprises a release button which is mounted in the headrest and movable in translation, a transfer plate mounted pivotably in the headrest, and a slider which is movable in the translation direction of the release button and mounted in the base component. For release, a shoulder of the release button pivots the transfer plate and the transfer plate moves the slider via a shoulder thereof. Via a transfer means, the slider moves the second fixing element out of engagement with the first fixing element. The transfer plate allows a contact with the shoulder of the release button in various retraction or extension positions of the headrest.

In this aspect, it is provided in particular that the release button, its shoulder and the slider are movable in a vehicle transverse direction of the headrest module; the transfer plate is pivotable about the axis arranged in the vehicle longitudinal direction of the headrest module; and the second fixing element is movable in a vehicle height direction of the headrest module.

In particular, the release button and/or the transfer plate and/or the slider can each be set in their release movement against the force of a spring. If the release button is not actuated manually, in particular pressed, the respective spring presses the release mechanism back into its starting position.

Preferably, limiting means are provided for limiting a maximum insertion movement and/or a maximum extension movement of the headrest relative to the base component.

The headrest module is in particular configured as a pre-assembled component. The headrest module can be mounted particularly easily if, in the region of its base component, it can be connected to a vehicle seat backrest via premounting clips and screw connections. Firstly the base component is thus premounted to the vehicle seat backrest via clips. Then the base component is screwed to the vehicle seat backrest for permanent fixing of the headrest module to the vehicle seat backrest.

A preferred exemplary embodiment of the headrest module according to the disclosure is explained in the appended drawing and its description, without being restricted to this exemplary embodiment.

The drawings illustrate a headrest module 1 for a motor vehicle seat, for example a driver's seat. The coordinates of this headrest module 1 are indicated with x, y and z, wherein the x coordinate depicts the vehicle longitudinal direction, in this case the forward travel direction indicated by the arrow; the y coordinate is the vehicle transverse direction, in this case the direction towards the right side of the vehicle indicated by the arrow; and the z coordinate is the vehicle vertical direction, in this case the upward direction indicated by the arrow.

The headrest module 1 has a base component 2 and a headrest 3. The headrest 3 is guided in the vehicle longitudinal direction x so as to be retractable and extendable relative to the base component 2. The headrest module 1 furthermore has a fixing mechanism 4 between the base component 2 and the headrest 3. The fixing mechanism 4 has a first fixing element 5 with teeth 6 which is arranged in the vehicle longitudinal direction x, and a second fixing element 7 which can be moved towards the first fixing element 5 for engagement between adjacent teeth. The contact faces of the two fixing element 5, 7 are configured such that the headrest 3 can be extended under the action of a force on the headrest 3 in its extension direction, i.e. the positive x direction, and the headrest 3 can be moved in its retraction direction, i.e. the negative x direction, under the action of a release mechanism 8 of the headrest module 1 which moves the second fixing element 7 out of the region between the teeth 6 of the first fixing element 5.

The first fixing element 5 is mounted in the headrest 3, the second fixing element 7 is mounted in the base component 2, and the release mechanism 8 is mounted in the base component 2 and the headrest 3. The teeth 6 are configured identically and the tooth spacings of adjacent teeth 6 are identical.

The headrest 3 has a guide portion 9 with side guides 10. These guides 10 cooperate with guides 11 of the base component 2. The side guides 10 of the guide portion 9 are connected by means of a connecting portion 12. This receives the teeth 6. The teeth 6 are arranged in the y direction. The teeth 6 extend over the entire width of the connecting portion 12, i.e. from the one guide 10 to the other guide 10. The extent of the respective tooth 6 in width (y direction) is a multiple of the extent of said tooth 6 in height (z direction), in particular five to fifteen times.

Figure 9:
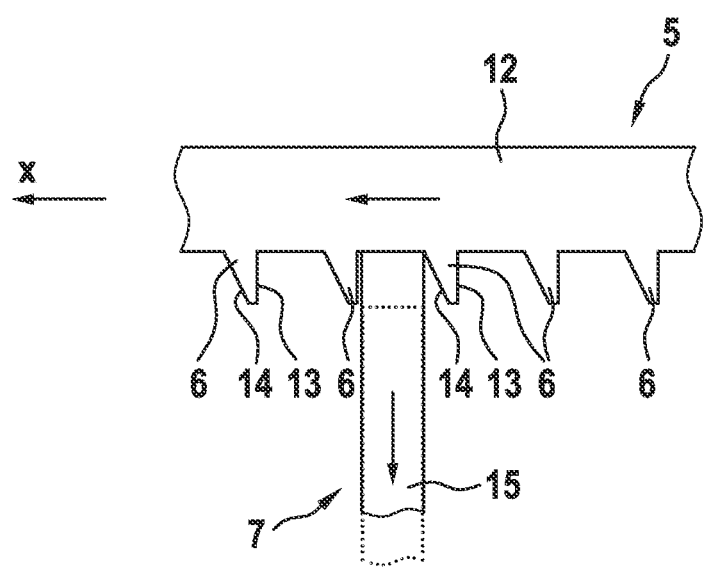
FIG. 9 shows, in a detail view, cooperation of the first fixing element and second fixing element.

The plurality of teeth 6 are arranged in a sawtooth pattern. The respective tooth 6 has a tooth cross-section such that a tooth flank 13, which is trailing in the movement direction x according to FIG. 9, is arranged in a plane perpendicular to the movement direction x of the headrest 3, and the other tooth flank 14 is arranged sloping relative to said plane, wherein the distance from the tooth flank 13 to the tooth flank 14 in the region of a base of the tooth 6 is greater than the distance of said tooth flank 13 to said tooth flank 14 in the region remote from said tooth 6.

The second fixing element 7 has a plate 15 mounted movably in the base component 2 for engagement between two adjacent teeth 6. The plate 15 is movable against the force of a spring 16 when the connecting portion 12 shifts in the x direction, and hence the teeth 6 move in the x direction out of the engagement position (shown with a solid line in FIG. 9) between two adjacent teeth 6, 6 into the disengagement position shown by dotted lines in FIG. 9. Here, the respective sloping tooth flank 14, on engagement with the plate 15, pushes this down in the z direction against the force of the spring 16.

The release mechanism 8 has a release button 17 which is mounted in the headrest 3 and is movable in translation in the y direction; a transfer plate 18 which is mounted pivotably in the headrest 3—in the case of pivotability, about the x-axis; and a slider 19 which is movable in the y axis. For release, a shoulder 20 of the release button 17 pivots the transfer plate 18 and moves this via a shoulder 21 of the slider 19. Via a transfer means 22, the slider 19 moves the plate 15 out of engagement with regard to the respective pair of adjacent teeth 6. Thus under the action of the release button 17, via the transfer means 22, the slider 19 moves the plate 15 down in the z direction following the dotted line in FIG. 9. This movement is achieved by a sloping contact face 23 of the transfer means 22 running up a sloping contact face 24 in a lower region of the plate 15.

The transfer plate 18, which extends in the movement direction x of the headrest 3, allows a defined contact between the shoulder 21 and the transfer plate 18 in the various extension positions of the headrest 3.

Springs 25 and 26 are assigned to the headrest 3. The spring 25 acts on the release button 17 and preloads this in its non-actuated position. The spring 26 preloads the transfer plate 14 against the shoulder 20 of the release button 17. The spring 16 is assigned to the base component 2 and preloads the plate 17 against the connecting portion 12 on the tooth side.

A limiting means 27 is provided, which is configured as a stop for limiting the maximum insertion movement of the headrest 3 relative to the base component 2, and a further limiting means 28 which is configured as a stop for limiting the maximum extension movement of the headrest 3 relative to the base component 2.

The headrest module 1 is provided with various clips 29 in the region of its base component 2 for premounting of the base module to an upper seat structure 31 in the head region of a backrest of the vehicle seat. After premounting, the headrest module 1 is fixedly connected to the seat structure 31 via screw connections 30 in the region of its base component 2.

Figure 2:
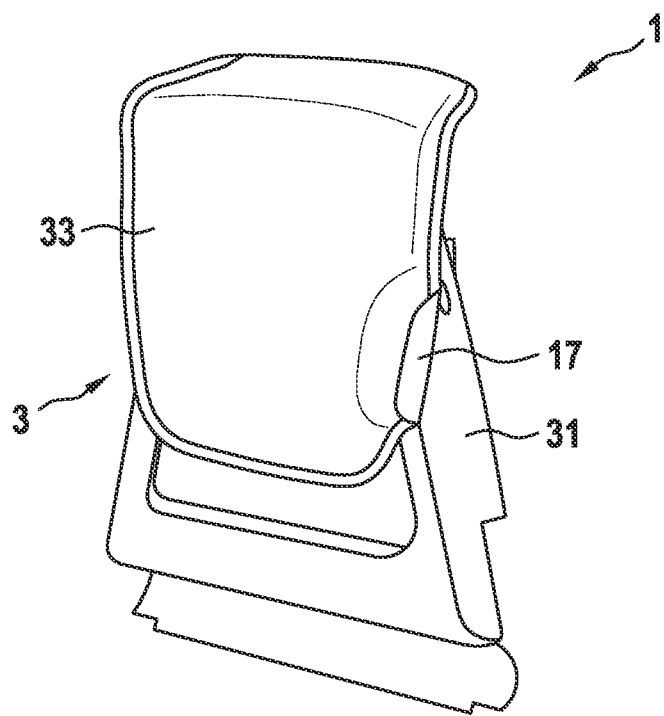
FIG. 2 shows the arrangement according to FIG. 1 with headrest upholstery removed.
Figure 3:
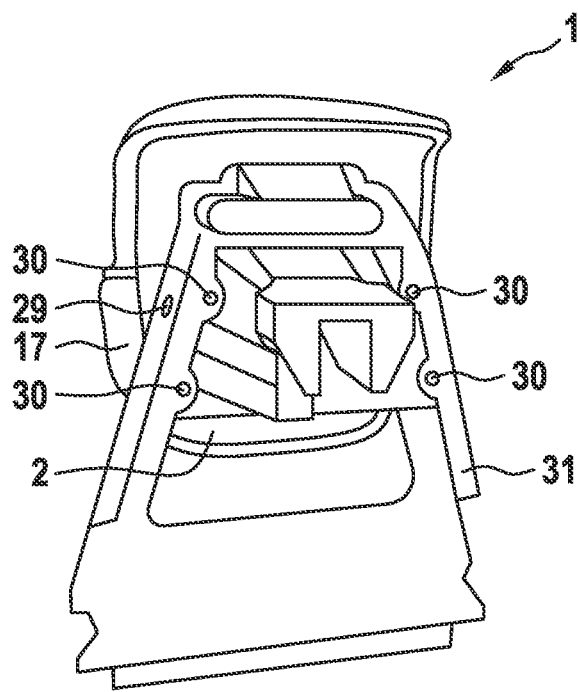
FIG. 3 shows the arrangement from FIG. 2, viewed obliquely from the rear.
Figure 4:
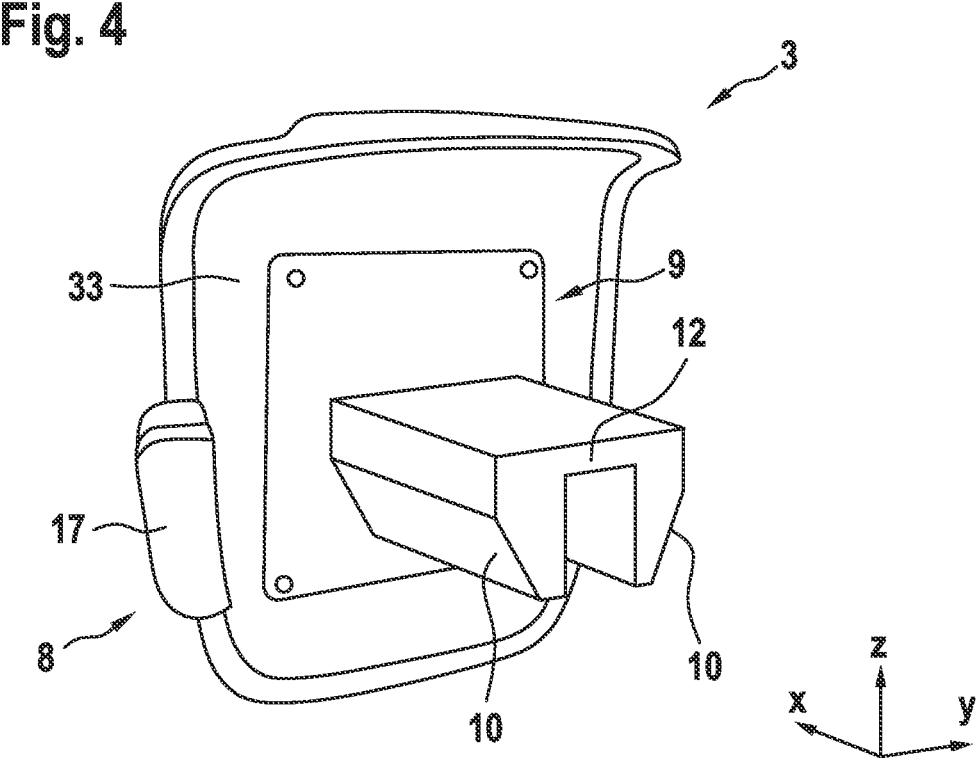
FIG. 4 shows the headrest of the headrest module with the upholstery removed, in a view corresponding to FIG. 3.
Figure 5:
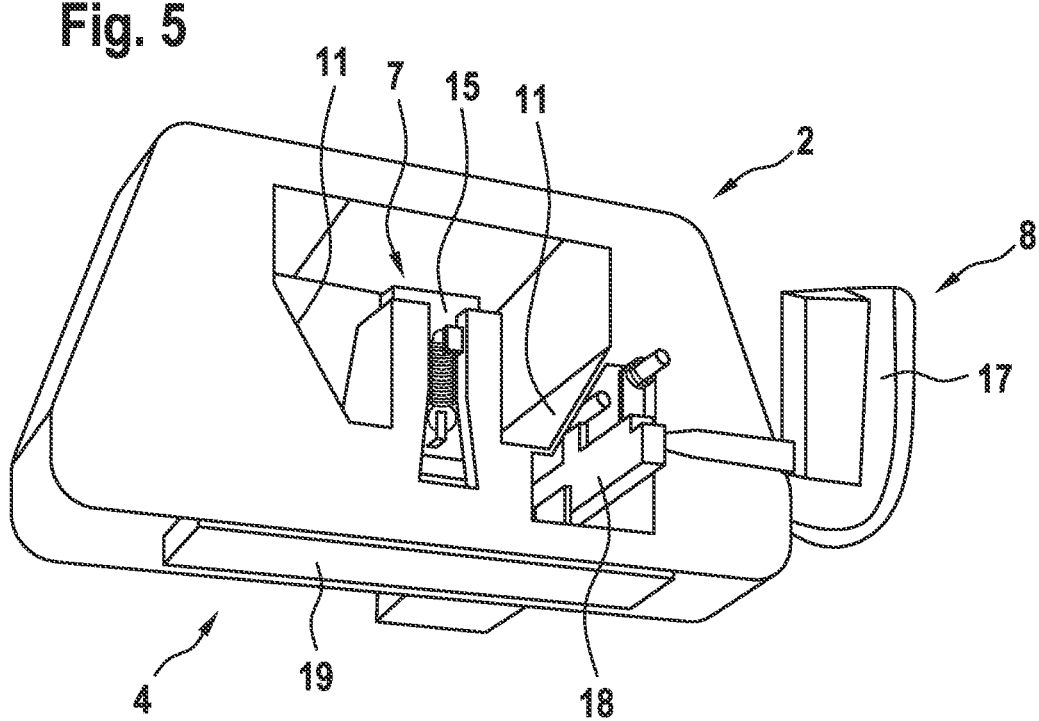
FIG. 5 shows a base component of the headrest module, a part of a fixing mechanism mounted in the base component, and a release mechanism of the headrest module, viewed obliquely from the front and below.
Figure 6:
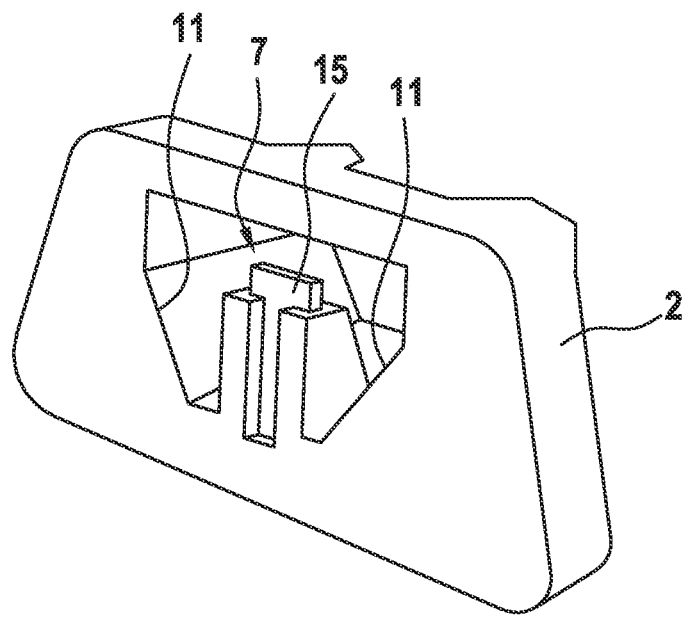
FIG. 6 shows the base component of FIG. 5 and the part of the fixing mechanism mounted therein, viewed obliquely from the front and above.
Figure 7:
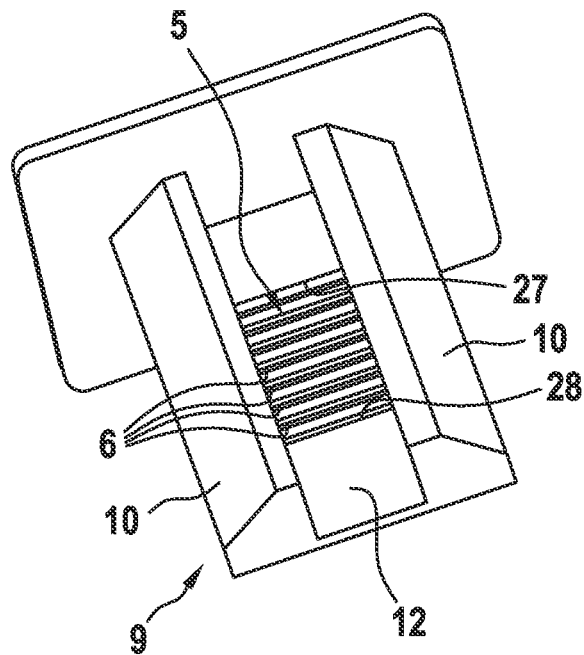
FIG. 7 shows a guide slide of the headrest viewed obliquely from below.
Figure 8:
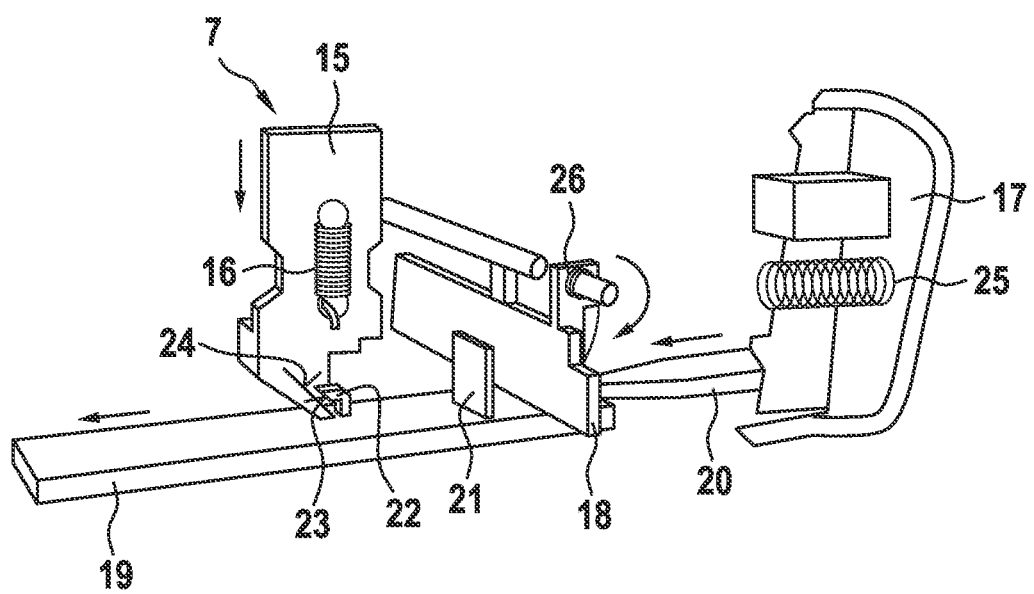
FIG. 8 shows the release mechanism and the component of the fixing mechanism cooperating therewith on the base component side.

FIG. 1 shows a complete headrest 3 and the upholstery 32 facing the head of the vehicle occupant. FIG. 2 shows the arrangement according to FIG. 1 but with the upholstery 32 removed, wherein an impact plate, which serves to receive the upholstery 32, is visible in the headrest 3. This impact plate 33 is screwed to the guide portion 9, as evident in particular from the depiction in FIG. 4.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Headrest module
2 Base component
3 Headrest
4 Fixing mechanism
5 First fixing element
6 Tooth
7 Second fixing element
8 Release mechanism
9 Guide portion
10 Guide
11 Guide
12 Connecting portion
13 Tooth flank
14 Tooth flank
15 Plate
16 Spring
17 Release button
18 Transfer plate
19 Slider
20 Shoulder
21 Shoulder
22 Transfer means
23 Contact face
24 Contact face
25 Spring
26 Spring
27 Limiting means
28 Limiting means
29 Clips
30 Screw connection
31 Seat structure
32 Upholstery
33 Impact plate
x Coordinate
y Coordinate
z Coordinate

What is claimed is:

1. A headrest module for a motor vehicle seat, the headrest module comprising:
   a base component;
   a headrest mounted in the base component, wherein the headrest is configured to be guided in a vehicle longitudinal direction of the headrest module so as to be extendable and retractable relative to the base component, and
   a fixing mechanism between the base component and the headrest, the fixing mechanism having a first fixing element with teeth, the first fixing element being arranged in the vehicle longitudinal direction, and a second fixing element configured to be moved towards the first fixing element for engagement between adjacent teeth,
   wherein contact faces of the two fixing elements are configured such that an extension of the headrest is possible under the action of a force on the headrest in an extension direction,
   wherein a movement of the headrest in a retraction direction is possible under action of a release mechanism of the headrest module configured to move the second fixing element out of a region between the teeth of the first fixing element,
   wherein the release mechanism comprises:
      a release button mounted in the headrest and movable in translation,
      a transfer plate mounted in a manner able to slope in the headrest, and
      a slider configured to be moved in a translation direction of the release button and mounted in the base component,
   wherein for release, a shoulder of the release button is configured to pivot the transfer plate and move the transfer plate via a shoulder of the slider, and
   wherein the slider, via a transfer mechanism, moves the second fixing element out of engagement with the first fixing element.

2. The headrest module as claimed in claim 1, wherein the first fixing element is mounted in the headrest and the second fixing element is mounted in the base component.

3. The headrest module as claimed in claim 1, wherein the teeth are formed identically, and wherein tooth spacings between adjacent teeth are identical.

4. The headrest module as claimed in claim 1, wherein the headrest has a guide portion with side guides, wherein the guides cooperate with guides of the base component.

5. The headrest module as claimed in claim 4, wherein the side guides of the guide portion are connected by a connecting portion, wherein the connecting portion receives the teeth, wherein the teeth are arranged in the vehicle transverse direction of the headrest module, and wherein the teeth are arranged parallel to each other.

6. The headrest module as claimed in claim 1, wherein an extent of a respective tooth in a width dimension amounts to a multiple of an extent of the respective tooth in a height dimension.

7. The headrest module as claimed in claim 1, wherein the respective tooth has a tooth cross-section such that a first tooth flank of the respective tooth is arranged in a plane perpendicular to a movement direction of the headrest, and wherein a second tooth flank of the respective tooth is arranged sloping relative to the plane, wherein a distance from the first tooth flank to the second tooth flank in a region of a base of the tooth is greater than a distance from the first tooth flank to the second tooth flank in a region remote from a base of the tooth.

8. The headrest module as claimed in claim 1, wherein the second fixing element comprises a plate, the plate being mounted movably in the base component for engagement between two adjacent teeth, wherein the plate is configured to be moved out of an engagement position between two adjacent teeth against a force of a spring.

9. The headrest module as claimed in claim 1, wherein a stop is provided for limiting a maximum insertion movement and/or a maximum extension movement of the headrest relative to the base component.

10. The headrest module as claimed in claim 1, wherein the headrest module is configured, in a region of its base component, to be connected to a vehicle seat backrest via premounting clips and screw connections.

11. The headrest module as claimed in claim 1, wherein the release button, its shoulder, and the slider are configured to move in the vehicle transverse direction of the headrest module, wherein the transfer plate is configured to pivot about an axis arranged in the vehicle longitudinal direction of the headrest module, and wherein the second fixing elements is configured to be moved in a vehicle height dimension of the headrest module.

12. The headrest module as claimed in claim 1, wherein the release button and/or the transfer plate and/or the slider can each be set in their release movement against the force of a spring.

* * * * *